(12) United States Patent
Sandford

(10) Patent No.: US 11,582,967 B2
(45) Date of Patent: Feb. 21, 2023

(54) MEDIUM AND METHODS FOR THE STORAGE OF RED BLOOD CELLS

(71) Applicant: Fenwal, Inc., Lake Zurich, IL (US)

(72) Inventor: Craig L. Sandford, Buffalo Grove, IL (US)

(73) Assignee: Fenwal, Inc., Lake Zurich, IL (US)

( * ) Notice: Subject to any disclaimer, the term of this patent is extended or adjusted under 35 U.S.C. 154(b) by 0 days.

(21) Appl. No.: 15/234,928

(22) Filed: Aug. 11, 2016

(65) Prior Publication Data

US 2017/0042139 A1 Feb. 16, 2017

Related U.S. Application Data

(60) Provisional application No. 62/204,550, filed on Aug. 13, 2015.

(51) Int. Cl.
*A01N 1/02* (2006.01)
(52) U.S. Cl.
CPC .................. *A01N 1/0226* (2013.01)
(58) Field of Classification Search
CPC .................................................. A01N 1/0226
See application file for complete search history.

(56) References Cited

U.S. PATENT DOCUMENTS

| 4,140,162 | A | | 2/1979 | Gajewski et al. |
| 4,386,069 | A | * | 5/1983 | Estep ................... A61K 35/14 |
| | | | | 206/438 |
| 4,432,750 | A | * | 2/1984 | Estep ................... A01N 1/02 |
| | | | | 604/6.15 |
| 5,026,347 | A | | 6/1991 | Patel |
| 5,037,419 | A | * | 8/1991 | Valentine ............ A61M 1/0209 |
| | | | | 604/403 |
| 5,849,843 | A | | 12/1998 | Laurin et al. |
| 6,221,668 | B1 | * | 4/2001 | Ryan ................. G01N 33/5094 |
| | | | | 252/408.1 |
| 6,579,583 | B2 | | 6/2003 | Patel |
| 2014/0091047 | A1 | | 4/2014 | Radwanski et al. |

OTHER PUBLICATIONS

NPL document "Milk" is a screenprint of USDA food database calculator at https://www.fatsecret.com/calories-nutrition/usda/milk-(nonfat)?portionid=56551&portionamount=100.000 accessed Feb. 17, 2018.*
Joseph Brunner, Helmut Hauser, and Giorgio Semenza, Single Bilayer Lipid-Protein Vesicles Formed from Phosphatidylcholine and Small Intestinal Sucrase-Isomaltase, 1978, Journal of Biological Chemistry, vol. 253, pp. 7538-7546 (Year: 1978).*
Andreas Heinemann, "Ultrasound and Watt", accessed at http://www.protocol-online.org/forums/uploads/monthly_03_2009/post-7691-1236077501.ipb on Jun. 10, 2018 (Year: 2009).*
(Continued)

*Primary Examiner* — David W Berke-Schlessel
*Assistant Examiner* — Trent R Clarke
(74) *Attorney, Agent, or Firm* — Cook Alex Ltd.

(57) ABSTRACT

An aqueous storage solution for the storage of red blood cells, comprising an aqueous solution and at least one lipid, wherein the at least one lipid is effective in suppressing hemolysis in red blood cells and wherein the at least one lipid is emulsified within the aqueous solution.

16 Claims, 1 Drawing Sheet

(56) References Cited

OTHER PUBLICATIONS

Peter van Hoogevestand Armin Wendel, The use of natural and synthetic phospholipids as pharmaceutical excipients, 2014, Eur. J. Lipid Sci. Technol., vol. 116, pp. 1088-1107 (Year: 2014).*

Rock G, et. al. Incorporation of plasticizer into red cells during storage. Transfusion. Nov.-Dec. 1984;24(6):493-8.

Bernard Horowitz, et. al. Stabilization of Red Blood Cells by the Plasticizer, Diethylhexylphthalate. Vox Sanguinis. Feb. 1985. 48(3):150-5.

* cited by examiner

Fig. 1
Fig. 2
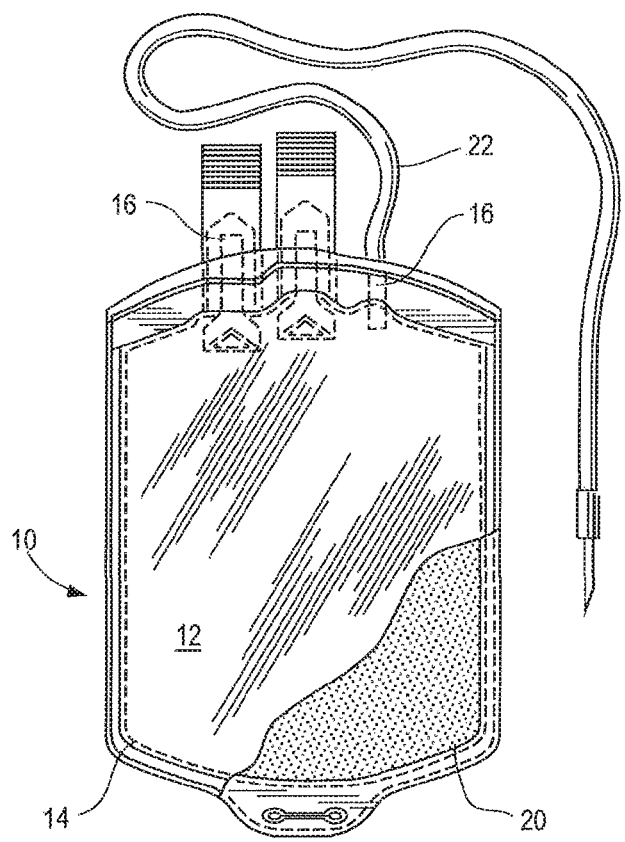
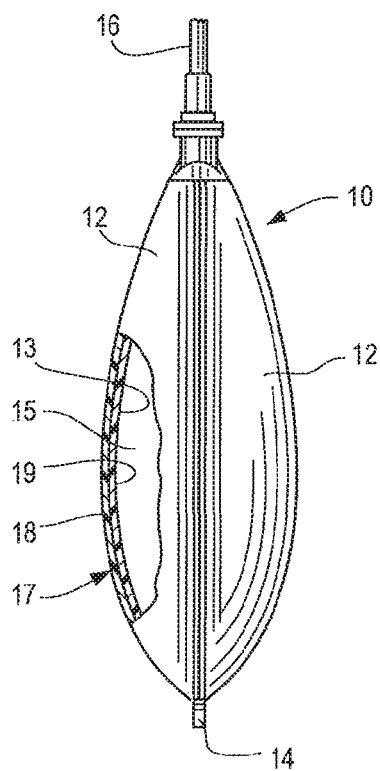

ated hereto.
MEDIUM AND METHODS FOR THE STORAGE OF RED BLOOD CELLS

CROSS-REFERENCE TO RELATED APPLICATIONS

This application claims the benefit of U.S. Provisional Patent App. No. 62/204,550 filed Aug. 13, 2015, which is expressly incorporated herein by reference in its entirety.

FIELD OF THE DISCLOSURE

The present disclosure is directed to a blood cell storage solution and a method of making the same, more particularly, to a system and method of making a blood cell storage solution conducive to reduced blood hemolysis.

BACKGROUND

Red blood cells are often separated from whole blood and collected for later transfusion to a patient in need of red blood cells. For example, red blood cells (hereinafter "RBCs") may be administered to a patient suffering from a loss of blood due to trauma, as a post-chemotherapy treatment, or as part of a treatment of one or more blood-borne diseases, such as certain anemias and the like. Unless administered immediately after collection from a donor, RBCs may be stored for some period of time prior to transfusion. The storage period may be anywhere from a few days to several weeks.

Prolonged storage of RBCs may affect RBC function. In order for the RBCs to be suitable for transfusion to the recipient, RBCs should maintain adequate cell function and metabolism. For example, RBCs should maintain an adequate concentration of adenosine triphosphate (ATP) and 2,3-DPG. In addition, stored RBCs should have acceptably low levels of hemolysis. Typically, an acceptable level of hemolysis is below 1.0% (in, for example, the U.S.) and 0.8% (in Europe) after 42 days in storage.

Media for providing a storage environment for RBCs that will allow cell function and cell metabolism to be preserved and maintained have been developed and are commonly used. The media developed for RBCs may prolong the storage life of RBCs. Examples of storage media are Adsol and SAG-M, available from Fenwal, Inc., of Lake Zurich, Ill. The development and use of storage media and container materials that provide an optimal storage environment for red blood cells remain a topic of keen interest.

SUMMARY

According to an exemplary embodiment, the present disclosure is directed to an aqueous storage solution for the storage of red blood cells, comprising an aqueous solution and at least one lipid, wherein the at least one lipid is effective in suppressing hemolysis in red blood cells and wherein the at least one lipid is emulsified within the aqueous solution.

According to an exemplary embodiment, the present disclosure is directed to a method of creating a red blood cell storage solution, the method comprising adding at least one lipid to an aqueous solution to form a mixture and sonicating the mixture, wherein the sonicated mixture comprises the at least one lipid emulsified within the aqueous solution.

BRIEF DESCRIPTION OF THE DRAWINGS

Features, aspects, and advantages of the present embodiments will become apparent from the following description, appended claims, and the accompanying exemplary embodiments shown in the drawings, which are briefly described below.

FIG. 1 is a plan view of a blood container to hold a red blood cell storage solution and red blood cells, according to an exemplary embodiment; and FIG. 2 is a side view of the container of FIG. 1, according to an exemplary embodiment.

DETAILED DESCRIPTION

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

During storage, concentrated RBCs and the storage media in which they are stored may be kept in a sealed container, usually made of a plastic material. Containers approved for the collection of whole blood and the storage of RBCs may often be made of a polyvinyl chloride (PVC). Due to the fact that PVC can be somewhat rigid or brittle, a plasticizer may be incorporated into the PVC. Examples of currently known and used plasticizers for medical grade PVC are DEHP, TEHTM, and certain families of citrate esters.

FIGS. 1 and 2 depict an embodiment of a blood storage container that may be used to hold red blood cells and a storage solution incorporating lipids. Container 10 may include one or more container walls 12 which define an interior chamber 15 for receiving the RBCs and storage solution composition 20. In one embodiment, two sheets made of a plastic material may be brought together and sealed along their peripheries 14 to form container 10. Other ways of making container 10 will be known to those of skill in the art and are within the scope of the present disclosure. As shown in FIG. 2, container wall 12 may include an inner surface 13 which contacts the RBCs and an outer surface 17. In one embodiment, container wall 12 may be made of a single layer of a polymer material, such as PVC or non-PVC polymer or polymer blend. In another embodiment, container wall 12 may be made of a multiple sheet laminate wherein inner surface 13 is made of one material and outer surface 17 is made of a different material. Container 10 may include one or more access ports 16 for connection with tubing 22, docking devices and the like to establish flow into and out from the interior chamber 15 of container 10.

Container 10 may include container walls that are made in whole or at least in part of a plastic material that may include at least one or more polymeric compounds. The one or more plastic and/or polymeric compounds may be blended together and formed into flat sheets that are sealed together. The polymeric material may be made from or otherwise include polyvinyl chloride (PVC) or one or more non-PVC polyolefin homopolymers, copolymers or blends thereof. Examples of suitable non-PVC polyolefins include polyethylene and polypropylene. These may include ultra low density polyethylene (ULDPE) and very low density polyethylene (VLDPE). Other suitable compounds that may be used in the plastic materials of the containers or as part of the blend for making the plastic materials include ethylene vinyl acetate (EVA) and block copolymers such as Kraton®. Exemplary formulations and/or the polyolefins, polyolefin blends or other polymeric compounds which are useful, either alone or in combination, in the manufacture of containers suitable for use in the RBC products of the present disclosure are described in U.S. Pat. Nos. 5,026,347, 4,140,162, 5,849,843, and 6,579,583, all of which are incorporated herein by reference in their entireties.

Containers useful in the methods, systems, and products disclosed herein may include PVC or be substantially free of PVC. Thus, in one embodiment, the formulations used to make container walls 12 of container 10 shown in FIGS. 1 and 2 may be at least substantially free of PVC. At the very least, surface 13 of container wall 12 may be substantially free of PVC. In an embodiment where container 10 is made of a multiple sheet laminate the sheet providing inner surface 13 may be made substantially of a non-PVC material while the sheet providing outer surface 17 may be made of a different material. More typically, however, the container wall 12 may be made of a single sheet of a non-PVC polyolefin, as described above.

In an embodiment where container 10 includes a plasticizer, non-phthalate plasticizers or non-DEHP plasticizers are preferred. Non-phthalate plasticizers include 1,2-cyclohexane dicarboxylic acid diisononyl ester (DINCH), dioctyl terephthalate (bis(2-ethylhexyl) benzene-1,4-dicarboxylate (DEHT), acetyl tributyl citrate (ATBC), n-butyryl n-hexyl citrate (BTHC), triethyl citrate, among others. Container 10 may also include low-leaching plasticizers, such as TEHTM.

Certain plasticizers have been shown to have an incidental beneficial effect on the storage life of RBCs stored in the containers having the incorporated plasticizers. Plasticizer molecules have been known to "leach" from the container into the storage solution and RBCs contained in the container. Plasticizers such as DEHP and a family of citrate esters have been found to suppress hemolysis of RBCs stored in containers that include such leachable plasticizers. One possible mechanism of action is the plasticizer molecules replacing components of the RBC cell wall as the cell walls oxidize and lose lipids, as reported in Rock, et al. "Incorporation of plasticizer into red cells during storage," Transfusion, 1984 and Horowitz et al. "Stabilization of RBCs by the Plasticizer, Di(ethylhexyl)phthalate," Vox Sanguinis, 1985.

Hemolysis reduction similar to those obtained with plasticizers may be achieved by incorporating low levels of emulsified fatty acids (lipids) into RBC storage media. RBC storage media with enhanced capability of effecting acceptable hemolysis levels may increase the variety of RBC storage containers available for use, including non-PVC containers and containers without plasticizers.

Some embodiments may effect hemolysis reduction without the use of plasticizers.

Some embodiments may effect hemolysis reduction with the use of fatty acids, lipids, and/or phospholipids.

Some embodiments may effect hemolysis reduction with the use of molecules naturally found in the RBC wall.

According to an exemplary embodiment, the RBC storage media may provide a storage environment for RBCs that allow cell function and cell metabolism to be preserved and maintained. The RBC media may prolong the storage life of RBCs for up to 42 days or more and may include a buffer to help maintain the pH of the RBCs, electrolytes, membrane-protecting compound(s) (e.g., fatty acid additives), and other additives to enhance and extend the life of the RBCs.

According to an exemplary embodiment, the RBC storage media may allow for the extended storage of RBCs for over 21 days, over 35 days, up to at least 42 days, and even up to at least 49 and/or 56 days with decreased hemolysis. In one embodiment, the RBC storage media may include at least sodium chloride, glucose (nutrient), mannitol and adenine. In a specific example, the media includes approximately 111 mM (millimoles) glucose (dextrose), 154 mM sodium chloride, 41 mM mannitol and 2.0 mM adenine. The media also has a pH of about 5.0 and is substantially isotonic.

In another embodiment, the media suitable for the storage of RBCs in accordance with the present disclosure may generally be hypotonic and may not contain sodium chloride. Such media may also include a nutrient, a buffer, other additives such as sodium citrate, and may typically have a pH of about 8.0 or higher.

More specific examples of hypotonic, high pH additive solutions are described in U.S. Patent Publication No. US 2014/0091047, which is incorporated herein by reference in its entirety. In a specific embodiment, the RBC storage media includes between about 1 to 2.2 mM of adenine; about 20 mM to about 110 mM of mannitol; about 2.2 mM to about 40 mM sodium citrate; about 16 mM to about 30 mM sodium phosphate dibasic and about 20 mM to about 140 mM of glucose. The pH of the additive solution is above about 8.0.

Concentrated RBCs with some or most of the plasma removed may be combined with the storage media of the type described above to provide the RBC composition. In one embodiment, the RBC composition may include between about 80 to 150 ml of the storage media combined with about 180 to 250 ml of the concentrated RBCs. The storage media may also comprise lipids, as described in the following studies.

Study—Additives Emulsified with Solvent

The following study was conducted to investigate hemolysis-suppressing effects of additive emulsions on freshly collected leukoreduced RBC's anticoagulated with citrate-phosphate-dextrose (CPD) and stored in Adsol. Table A tables the additives that were studied.

TABLE A

| # | Additive | Supplier/description |
| --- | --- | --- |
| 1 | Cholesterol | Sigma Aldrich >99% |
| 2 | Phosphatidyl choline | Sigma Aldrich >99% |

Each additive in Table A was dissolved in DEGDBE (diethylene glycol dibutyl ether) to create two solutions. For cholesterol, a cholesterol/DEGDBE solution was created having a concentration of 0.0714 g/m L. For phosphatidyl choline (PC) a PC/DEGDBE solution was created having a concentration of 0.0156 g/mL. Table B lays out the cholesterol/DEGDBE and PC/DEGDBE solutions in #1 and #2, respectively. Further, equal amounts of #1 and #2 from Table B were combined to form a 50/50 blend of the cholesterol/DEGDBE and PC/DEGDBE solutions of #1 and #2. The 50/50 blend is listed in Table B as solution #3.

TABLE B

| # | Additive |
| --- | --- |
| 1 | Cholesterol saturated in DEGDBE (0.0714 g/mL) |
| 2 | Phosphatidyl choline saturated in DEGDBE (0.0156 g/mL) |
| 3 | 50/50 blend of #1 and #2 |

Approximately 1.5 ml of #1 in Table B was mixed with 1.5 ml of polysorbate 80 (emulsifier) to prepare an emulsion. Approximately 1.8 ml of #2 in Table B was mixed with 1.8 ml of polysorbate 80 to prepare an emulsion. 800 μL of each emulsion was then diluted in 83 ml of sterile 0.9% saline.

Each diluted emulsion was aliquoted into four 15 mL polypropylene test tubes, each tube being aliquoted 400 μL of diluted emulsion. RBCs were then prepared from whole blood per standard procedure using a kit with a RS 2000 whole blood filter. 6.0 mL of well-mixed leukoreduced CPT/Adsol RBCs were mixed into each polypropylene test tube containing the 400 μL aliquot. The test tubes were capped and inverted to mix. Approximately 5 mL from the RBC unit were sampled and separately analyzed for baseline total hemoglobin (g/dL), spun hematocrit (%), and plasma hemoglobin (mg/dL) per standard operating procedures.

The polypropylene test tubes containing the RBC/emulsion mixtures as well as the control tubes were stored at 2° C.-8° C. for 42 days. On day 42, samples from the test tubes were tested for total hemoglobin (g/dL), spun hematocrit (%), and plasma hemoglobin (mg/dL) per standard operating procedures. Percent hemolysis was calculated for each sample by analyzing plasma hemoglobin results. The results are provided in Table C.

TABLE C

| # | Additive | Hemolysis % | Estimated lipid level in RBCs |
|---|---|---|---|
| 1 | Cholesterol saturated in DEGDBE (0.0714 g/mL) | 0.35 | 21 ppm |
| 2 | Phosphatidyl choline saturated in DEGDBE (0.0156 g/mL) | 0.44 | 4.7 ppm |
| 3 | 50/50 blend of #1 and #2 | 0.27 | 11.5 ppm of #1 and 2.3 ppm of #2 |

Additives Emulsified with Sonication

The following procedure was followed to produce hemolysis-suppressing effects and implement the utilization of additives without the use of a solvent such as DEGDBE. Rather, additives were emulsified in water using sonication to achieve low hemolysis levels observed in the above study. Freshly collected leukoreduced RBC's anticoagulated with citrate-phosphate-dextrose (CPD) and stored in Adsol were used. Table D provides the additives that were utilized.

TABLE D

| # | Additive | Supplier/description |
|---|---|---|
| 1 | Cholesterol | Sigma Aldrich >99% |
| 2 | Thermolec WFC | ADM Lecithin (phosphatidyl choline and phosphatidylethanolamine) |
| 3 | Yelkin 1018 | ADM Lecithin (phosphatidyl choline and phosphatidylethanolamine) |
| 4 | α Tocopherol | Sigma Aldrich Vitamin E |

Six mixtures were created containing different combinations and amounts of the additives in Table D. The six mixtures are provided in Table E.

TABLE E

| Material | Mix 1 | Mix 2 | Mix 3 | Mix 4 | Mix 5 | Mix 6 |
|---|---|---|---|---|---|---|
| 0.9% saline | 250 ml | 250 ml | 250 ml | 250 ml | 250 ml | 250 ml |
| Cholesterol | 0.1 g | 0.075 g | 0.05 g | 0.025 g | 0.075 g | 0.075 g |
| Thermolec WFC | 0.025 g | 0.05 g | 0.075 g | 0.1 g | 0.05 g | |
| Yelkin 1018 | | | | | | 0.05 g |
| α Tocopherol | 0.002 g | 0.002 g | 0.002 g | 0.002 g | 0.001 g | 0.002 g |

These six mixtures were prepared as emulsions by sonicating the ingredients in saline. A Q500 Sonicator available from Qsonica was used to sonicate the ingredients. The Q500 Sonicator is characterized by a power rating of 500 watts, a frequency of 20 kHz, and a voltage of 110V, 50/60 Hz, but any similarly high powered sonication system capable of providing similar energy levels for dispersing materials into a fluid may be used. For each mixture listed in Table E, a 250 mL sterile bottle with cap was used to mix. To each sterile bottle was added 250 mL 0.9% saline. Then, the amounts of Thermolec WFC or Yelkin 1018 (PC), cholesterol, and tocopherol (vitamin E) indicated in Table E were added while stirring. Vitamin E in certain circumstances acts as an antioxidant to suppress oxidation of cell wall components, which otherwise can oxidize and lose lipids.

The Q500 Sonicator was then used to sonicate the ingredients in the six mixtures. Each mixture was sonicated as follows: 1) First cycle—60 seconds at 50% amplitude; 2) stir with a spatula; 3) Second cycle—30 seconds at 75% amplitude; 4) stir with a spatula; 5) Third cycle—30 seconds at 75% amplitude; 6) stir with a spatula; 7) Fourth cycle—30 second sonication at 75% amplitude. The majority of the ingredients formed an emulsion which remained stable.

10 mL of each sonicated emulsion mixture was added to the amount of 0.9% saline indicated in Table F in sterile 250 mL bottles. Table F also provides the calculated concentrations (in ppm) of the additives.

TABLE F

Calculated concentrations of additives in stored RBCs

| Saline (ml) | Mix 1 | | | Mix 2 | | | Mix 3 | | |
|---|---|---|---|---|---|---|---|---|---|
| | Chol. | Lecithin | Vit. E | Chol. | Lecithin | Vit. E | Chol. | Lecithin | Vit. E |
| 80 | 2.8 | 0.7 | 0.06 | 2.1 | 1.4 | 0.06 | 1.4 | 2.1 | 0.06 |
| 40 | 5.0 | 1.2 | 0.06 | 3.7 | 2.5 | 0.06 | 2.5 | 3.7 | 0.06 |
| 20 | 8.3 | 2.1 | 0.06 | 6.2 | 4.2 | 0.06 | 4.2 | 6.2 | 0.06 |
| 10 | 12.5 | 3.1 | 0.06 | 9.4 | 6.2 | 0.06 | 6.2 | 9.4 | 0.06 |

| | Mix 4 | | | Mix 5 | | | Mix 6 | | |
|---|---|---|---|---|---|---|---|---|---|
| | Chol. | Lecithin | Vit. E | Chol. | Lecithin | Vit. E | Chol. | Lecithin | Vit. E |
| 80 | 0.7 | 2.8 | 0.06 | 2.1 | 1.4 | 0.03 | 2.1 | 1.4 | 0.06 |
| 40 | 1.2 | 5.0 | 0.06 | 3.7 | 2.5 | 0.03 | 3.7 | 2.5 | 0.06 |
| 20 | 2.1 | 8.3 | 0.06 | 6.2 | 4.2 | 0.03 | 6.2 | 4.2 | 0.06 |
| 10 | 3.1 | 12.5 | 0.06 | 9.4 | 6.2 | 0.03 | 9.4 | 6.2 | 0.06 |

All samples bottles were capped and shaken to form stable emulsions. The samples were then autoclaved at 250° F. for 30 minutes with loosened caps to allow venting. The samples were then placed and maintained at 4° C.

Each sample was aliquoted into two 15 mL polypropylene test tubes, each tube being aliquoted 400 μL of each sample. RBCs were then prepared from whole blood per standard procedure using a kit with a RS 2000 whole blood filter. 6.0 mL of well-mixed leukoreduced CPT/Adsol RBCs were mixed into each polypropylene test tube containing the 400 μL aliquot. The test tubes were capped and inverted to mix. As a control, two 15 mL polypropylene test tubes containing 6.4 mL each of well-mixed leukoreduced CPT/Adsol RBCs were prepared. Approximately 5 mL from the RBC unit were sampled and separately analyzed for baseline total hemoglobin (g/dL), spun hematocrit (%), and plasma hemoglobin (mg/dL) per standard operating procedures. The polypropylene test tubes containing the RBC/emulsion mixtures as well as the control tubes were stored at 2° C.-8° C. for 42 days. On day 42, samples from the test tubes were tested for total hemoglobin (g/dL), spun hematocrit (%), and plasma hemoglobin (mg/dL) per standard operating procedures. Percent hemolysis was calculated for each sample by analyzing plasma hemoglobin results.

Although phospholipids PC and cholesterol were investigated, other natural additives may also be utilized. These include lecithin, sphingomyelin, phosphatidylethanolamine, and phosphatidylserine, or other suitable additives that can be made to remain dispersed uniformly in blood-like fluids. Depending on the additive and additive blend, an optimal concentration can be selected as a function of exposed surface area and solubility. In selecting a suitable additive or additive blend, several factors should be considered. For example, ease of transferability from storage fluid to the RBC wall may affect effectiveness and may be predicted with partition coefficients. Compatibility with the RBC wall may also be considered and may be predicted by test tube emulsion testing as demonstrated above. The additive or additive blend selected should help maintain RBC wall viability and to that end, minimum molecular weight and shape should be considered. The additive or additive blend selected should also be minimally sensitive to variation in the lipid bilayer fatty acid content between blood donors.

In the case in which the RBC storage media contains PC and/or cholesterol, the studies above have demonstrated that the PC, cholesterol, or PC/cholesterol blend may have a concentration from 2.3 ppm to 21 ppm when added to the RBCs, although unlike plasticizer levels in blood, a higher concentration of emulsified lipids may not exacerbate hemolysis. In the case in which the RBC storage media contains Vitamin E without PC and/or cholesterol or contains Vitamin E in addition to PC and/or cholesterol, the Vitamin E concentration may have values from 0.01 ppm to 0.1 ppm or higher, although a higher concentration of Vitamin E may not exacerbate hemolysis. In an embodiment in which container 10 of FIGS. 1 and 2 is used to hold concentrated RBCs combined with the storage media of the type described above, the volume of concentrated RBCs may be between about 180 to 250 mL, and the volume of storage media may be between 80 to 150 mL.

In addition to the option of the hemolysis-suppressing agents being separately mixed with saline prior to being added to the RBCs, as the studies above have described, the hemolysis-suppressing agents may be directly incorporated into a storage media (e.g., Adsol) to which RBCs may then be added.

The embodiments disclosed herein are for the purpose of providing a description of the present subject matter, and it is understood that the subject matter may be embodied in various other forms and combinations not shown in detail. Therefore, specific embodiments and features disclosed herein are not to be interpreted as limiting the subject matter as defined in the accompanying claims.

The invention claimed is:

1. A method of preparing a plasma-reduced red blood cell composition, the method comprising:
    adding cholesterol, phosphatidyl choline and Vitamin E to an aqueous solution comprising glucose, mannitol, adenine, sodium citrate, and sodium phosphate buffer to form a mixture;
    sonicating the mixture;
    wherein the sonicated mixture comprises the cholesterol, phosphatidyl choline and Vitamin E emulsified within the aqueous solution and is suitable for storage of red blood cells;
    combining said sonicated mixture with plasma-reduced concentrated red blood cells;
    wherein said cholesterol and phosphatidyl choline combined comprises 2.3 ppm to 21 ppm when the sonicated mixture is added to the plasma-reduced concentrated red blood cells, and
    wherein said method comprises dissolving said cholesterol in diethylene glycol dibutyl ether (DEGDBE) and dissolving said phosphatidyl choline in DEGDBE or dissolving a blend of cholesterol and phosphatidyl choline in DEGDBE.

2. The method of claim 1, further comprising adding at least one of sphingomyelin, phosphatidylethanolamine or phosphatidylserine to said mixture.

3. The method of claim 1, further comprising combining the sonicated mixture with said plasma-reduced concentrated red blood cells, wherein the red blood cells comprise a volume of concentrated red blood cells (RBCs) in the range of 180 to 250 ml, and the sonicated mixture comprises a volume in the range of 80 to 150 ml.

4. The method of claim 3, further comprising providing a non-PVC blood container to hold the sonicated mixture and red blood cells, wherein the blood container does not include a plasticizer.

5. The method of claim 4, wherein the blood container comprises at least one of a polyolefin, ethylene vinyl acetate, and block copolymer.

6. The method of claim 1, wherein the sonicated mixture further comprises sodium chloride.

7. The method of claim 1, wherein said sonicated mixture further comprises 1 to 2.2 mM adenine, 20 to 110 mM mannitol, 2.2 to 40 mM sodium citrate, 16 to 30 mM sodium phosphate dibasic, and/or 20 to 140 mM glucose.

8. The method of claim 1, wherein the sonicated mixture comprises a pH of about 5.0 and is isotonic.

9. The method of claim 1, wherein the sonicated mixture comprises a pH of about 8.0 or higher and is hypotonic.

10. The method of claim 1, wherein the mixture is sonicated by a 20 kHz signal for at least two cycles with intermittent stirring, each cycle comprising a sonication period of at least 30 seconds and a sonication amplitude of at least 50% amplitude.

11. The method of claim 1 wherein said Vitamin E has a concentration in the range of 0.01 ppm to 0.1 ppm when the sonicated mixture is added to said plasma-reduced, concentrated red blood cells.

12. The method of claim 11, wherein the mixture is sonicated by a 20 kHz signal for at least two cycles with intermittent stirring, each cycle comprising a sonication period of at least 30 seconds and a sonication amplitude of at least 50% amplitude.

13. The method of claim 1, wherein the cholesterol comprises a concentration of 11.5 ppm and the phosphatidyl choline comprises a concentration of 2.3 ppm when the sonicated mixture is added to red blood cells.

14. The method of claim 1, wherein the phosphatidyl choline added into the blend comprises a purity level greater than 99%.

15. The method of claim 1 further comprising storing said plasma-reduced concentrated red blood cells in said mixture for at least 42 days.

16. The method of claim 1, further comprising adding lecithin to said mixture.

* * * * *